United States Patent [19]

Wilkinson et al.

[11] Patent Number: 4,901,139
[45] Date of Patent: Feb. 13, 1990

[54] METHOD FOR PULSE CODE MODULATING A DIGITAL VIDEO SIGNAL

[75] Inventors: James H. Wilkinson, Hants, United Kingdom; Ueda Mamoru, Kanagawa, Japan

[73] Assignee: Sony Corporation, Tokyo, Japan

[21] Appl. No.: 223,527

[22] Filed: Jul. 25, 1988

[30] Foreign Application Priority Data

Jul. 29, 1987 [JP] Japan ............................ 62-189853
Jul. 29, 1987 [JP] Japan ............................ 62-189854
Jul. 29, 1987 [JP] Japan ............................ 62-189855

[51] Int. Cl.$^4$ ............................................ H04N 5/38
[52] U.S. Cl. ...................................... 358/13; 358/135
[58] Field of Search ................ 358/13, 12, 135, 133, 358/138, 260; 325/27, 33

[56] References Cited

U.S. PATENT DOCUMENTS

| | | | |
|---|---|---|---|
| 3,403,226 | 9/1968 | Wintringham | 358/135 X |
| 3,439,753 | 4/1969 | Mounts et al. | 358/135 |
| 4,622,579 | 11/1986 | Starck | 358/13 |
| 4,661,862 | 4/1987 | Thompson . | |
| 4,759,038 | 7/1988 | Takahashi et al. | 375/27 |

Primary Examiner—James J. Groody
Assistant Examiner—Victor R. Kostak
Attorney, Agent, or Firm—Sinderbrank Alvin

[57] ABSTRACT

In a system in which a digital video signal is transmitted with differential pulse code modulation, a predetermined number of samples alternate in a horizontal line of the digital video signal are grouped, and the center sample of the grouped samples of the digital video signal is transmitted with the original number of bits, while the other samples of a group are differentially modulated with reference to the respective center sample and are transmitted with the center sample as a cluster of samples.

7 Claims, 6 Drawing Sheets

| A4 | B0 | A5 | B1 | A6 | B2 | A7 | B3 | A8 | B4 | C0 | B5 | C1 | B6 | C2 | B7 | C3 | B8 | C4 | D0 | C5 | D1 | C6 | D2 | C7 | D3 | C8 | D4 |
|---|---|---|---|---|---|---|---|---|---|---|---|---|---|---|---|---|---|---|---|---|---|---|---|---|---|---|---|

FIG. 2B

| B4 | B3 | B5 | B2 | B6 | B1 | B7 | B0 | B8 |
|---|---|---|---|---|---|---|---|---|

FIG. 2C

| B4 | B3 | B5 | B2 | B6 | B1 | B7 | B0 | B8 |
|---|---|---|---|---|---|---|---|---|

FIG. 2D

| B4 | B4 | B3' | B5' | B2' | B6' | B1' | B7' |
|---|---|---|---|---|---|---|---|

FIG. 2E

| ΔO | ΔB3 | ΔB5 | ΔB2 | ΔB6 | ΔB1 | ΔB7 | ΔB0 | ΔB8 |
|---|---|---|---|---|---|---|---|---|

FIG. 2F

| B4 | B3' | B5' | B2' | B6' | B1' | B7' | B0' | B8' |
|---|---|---|---|---|---|---|---|---|

FIG. 2G

| B47 | | | | | | | | |
|---|---|---|---|---|---|---|---|---|
| B46 | | | | | | | | |
| B45 | | | | | | | | |
| B44 | ΔB34 | ΔB64 | ΔB14 | ΔB74 | ΔB04 | ΔB84 | | |
| B43 | ΔB33 | ΔB63 | ΔB13 | ΔB73 | ΔB03 | ΔB83 | | |
| B42 | ΔB32 | ΔB62 | ΔB12 | ΔB72 | ΔB02 | ΔB82 | | |
| B41 | ΔB31 | ΔB61 | ΔB11 | ΔB71 | ΔB01 | ΔB81 | | |
| B40 | ΔB30 | ΔB60 | ΔB10 | ΔB70 | ΔB00 | ΔB80 | | |

METHOD FOR PULSE CODE MODULATING A DIGITAL VIDEO SIGNAL

BACKGROUND OF THE INVENTION

1. Field of the Invention

The present invention relates to a DPCM (differential pulse code modulation) system adapted for compressing the quantity of information involved in the transmission of digital video signals.

2. Description of the Prior Art

In recording a digital color video signal on a magnetic tape, a great quantity of information has to be recorded. In an exemplary case of component color video data in the 4:2:2 mode, it becomes necessary to process data of about 216 megabits per second. When such huge quantity of information is to be recorded on a compact recording medium such as a cassette tape, the recording time is rendered extremely short owing to the fast tape speed that is required. In an attempt to solve this problem, resort has been had to the technique of band compression (also termed high efficiency encoding) to reduce the quantity of information to be recorded, thereby prolonging the recording time.

The DPCM (differential pulse code modulation) system, which compresses the difference between the anterior and posterior samples by non-linear quantization, is considered to be an effective band compression means for picture signals having mutual continuity and correlation.

In the DPCM system, a difference between the preceding decoded sample and an input sample is obtained and then is processed by non-linear quantization. Accordingly, in case any error exists in the decoded sample, a problem arises in that such error is propagated.

OBJECTS AND SUMMARY OF THE INVENTION

Accordingly, an object of the present invention is to provide a DPCM system which is capable of suppressing propagation of such error specific to the DPCM.

A further object of the present invention is to provide an improved DPCM system which is particularly suitable for the transmission of the component digital video signal.

In accordance with an aspect of the present invention, a cluster is formed out of every predetermined number (e.g. nine) of samples of an input digital signal, and the center sample positioned substantially at the center of such cluster is transmitted while being retained in its original number of bits, and the other samples of the cluster which are adjacent to the center sample are transmitted after being sequentially processed by DPCM, thereby minimizing the error propagation.

DESCRIPTION OF THE PREFERRED EMBODIMENTS

Hereinafter a preferred embodiment of the present invention will be described in detail. This embodiment represents application of the invention to an exemplary case of encoding a component color video signal.

Figure 3:
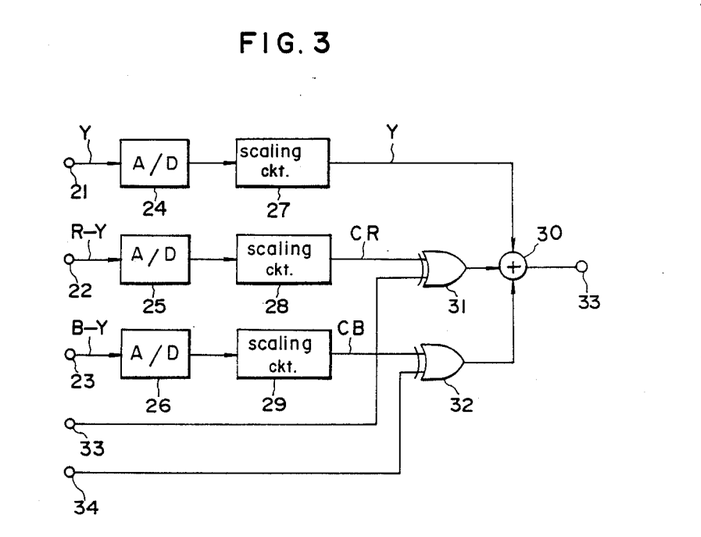
FIG. 3 is a block diagram of a component signal encoder.

Referring initially to FIG. 3, it will be seen that, in an encoder for compressing the bandwidth of a digital color video signal a luminance signal Y is fed to an input terminal 21, a red color difference signal R-Y is fed to an input terminal 22, and a blue color difference signal B-Y is fed to another input terminal 23. Such analog component signals are fed from the input terminal 21, 22 and 23 to A/D converters 24, 25 and 26, respectively, so that digital component signals of, e.g. 4:2:2 mode are formed. The digital component signals thus obtained are then fed to scaling circuits 27, 28 and 29 where scaling is effected.

The luminance signal Y from the scaling circuit 27 is fed to an adder 30. Meanwhile the output signal CR from the scaling circuit 28 is fed to an exclusive OR gate 31, and the output signal CB from the scaling circuit 29 is fed to an exclusive OR gate 32. Subsequently, the output signals from such exclusive OR gates 31 and 32 are fed to the adder 30. The exclusive OR gates 31 and 32 constitute digital modulation circuits in which the signals CR and CB are modulated by flag signals inputted from terminals 33 and 34, respectively. The flag signals are inverted at every sample in accordance with a field number and a line number. The output signal of the adder 30 is applied to an output terminal 33 as an encoded (4:0:0) signal.

Figure 4:
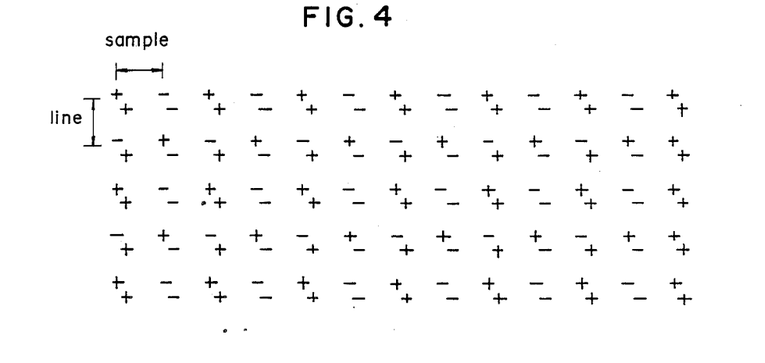
FIG. 4 is a schematic diagram to which reference will be made in explaining the output signal of the encoder shown in FIG. 3.

FIG. 4 shows such encoded output signal expressed by signs, where $(+_+)$ stands for $(Y+CR+CB)$, $(+_-)$ for $(Y+CR-CB)$, $(-_+)$ for $(Y-CR+CB)$, and $(-_-)$ for $(Y-CR-CB)$ respectively. As will be understood from the representation of FIG. 4, the codes of mutually adjacent samples are different from each other, but those of alternate samples spaced apart by one sample are the same.

Figure 5:
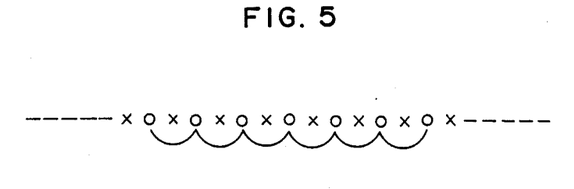
FIGS. 5, 6 and 7 are schematic diagrams to which reference will be made in explaining application of the present invention to the output signal of the encoder shown in FIG. 3.

In executing DPCM of the above coded signals, any DPCM error can be reduced by applying DPCM to a series of samples to minimize the difference between the anterior and posterior samples, as illustrated in FIG. 5.

Figure 6:
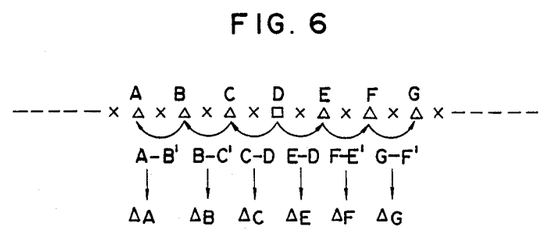

Furthermore, a cluster is formed by grouping several samples A to G as illustrated in FIG. 6, and the center sample D in such cluster is transmitted without being compressed. The error propagation effect can be suppressed by spreading the branch of DPCM sequentially from the center sample D to the two sides merely within the cluster. That is, using a non-linear quantization function f(x) for compression in FIG. 6, the sample D is transmitted without any compression while the other samples are transmitted in the sequence of [ΔC=f (C−D), ΔE=f (E−D), ΔB=f (B−C'), ΔA=f (A−B'), ΔF=f (F−E'), ΔG=f (G−F')]. In the above, [C'=D+ΔC, B'=C'+ΔB, E'=D+ΔE, F=E'+ΔF].

Figure 7:
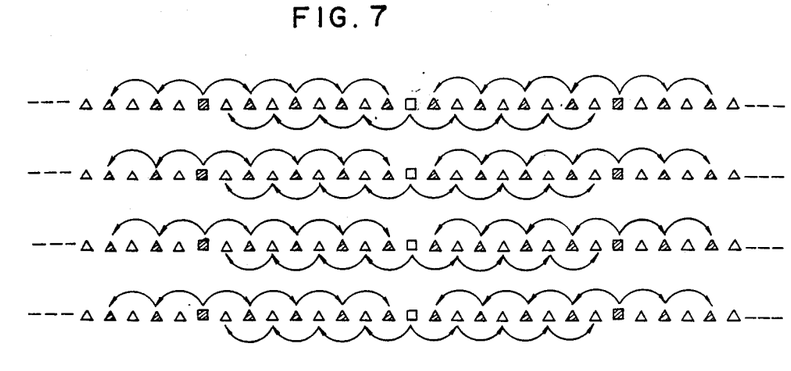

FIG. 7 illustrates an exemplary application of the present invention to a digital color video signal encoded as shown in FIG. 4. Since the number of effective samples per line is 720, such samples are divided into 80 clusters each composed of 9 samples. As shown in FIG. 7, 8-bit data inputted by clock pulses of 13.5 MHz are grouped in such a manner that 9 alternate samples are formed into one cluster. Out of such 9 samples, the center sample (□ and ■) is left unchanged in the form of its original 8-bit string, while the remaining 8 samples (Δ and ▲) are processed sequentially by DPCM so that the difference between the adjacent samples connected by an arrow becomes 5 bits for instance. Consequently, the quantity of information per cluster is compressed from (8 bits×9=72 bits) of the input signal to (8 bits+5 bits×8=48 bits). The compression rate is ⅔ in this case.

The error propagation effect is, at the most, 17 sample lengths (in 9 samples) if the center sample has any error. The error propagation effect is expressed as follows on the assumption that the error probability in each sample is equal to that in the other samples.

$$17\times(1/9)+7\times(1/9)+7\times(1/9)+5\times(1/9)+5\times(1/9)+3\times(1/9)+3\times(1/9)+1\times(1/9)+1\times(1/9)=5.4$$
(sample length)

$$9\times(1/9)+4\times(1/9)+4\times(1/9)+3\times(1/9)+3\times(1/9)+2(1/9)+2\times(1/9)+1\times(1/9)+1\times(1/9)=3.2$$
(samples)

Thus, the propagation of one error can be minimized to about 3 samples on the average.

Figure 8:
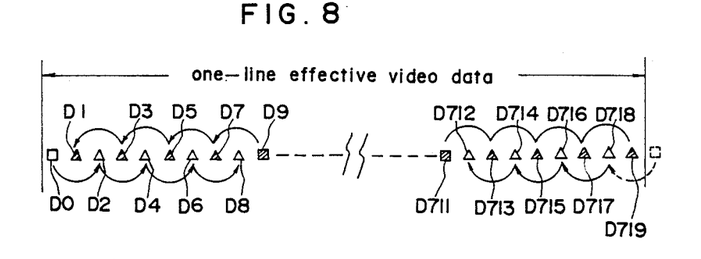
FIG. 8 is a schematic diagram for explaining the process at the beginning and the end of a line of effective video data.

At the beginning of the effective video signal in one horizontal line interval, as shown in FIG. 8, the left-hand data grouped with the center sample D0 is out of the effective range. Meanwhile at the end of such effective video signal, the right-hand data and the center sample grouped with samples D712, D714, D716 and D718 are rendered invalid. Therefore, as represented by a broken-line square at the right-hand end of FIG. 8, a black level value (30 in hexadecimal notation) is used as a provisional center sample data. Furthermore, each cluster is totally composed of 9 samples comprising 5 samples (D0, D2, D4, D6, D8) at the beginning and 4 samples (D718, D716, D714, D712) at the end.

Figure 1:
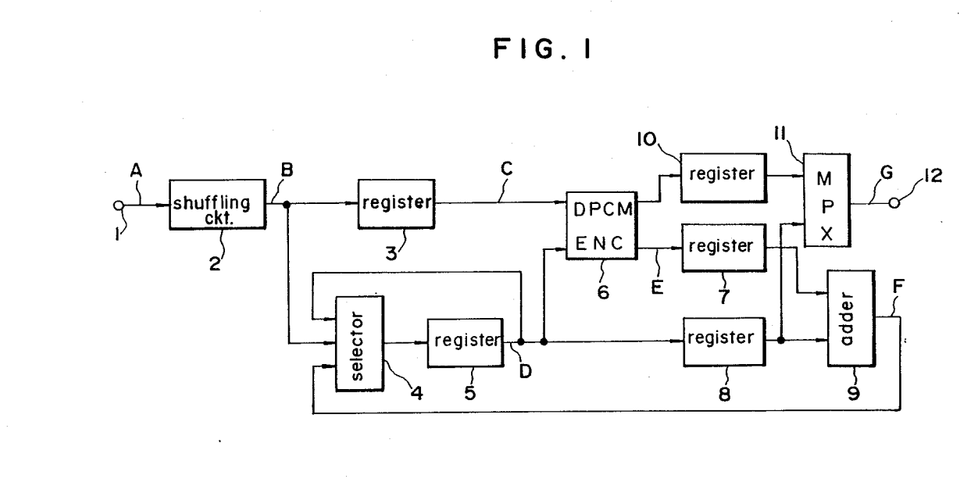
FIG. 1 is a block diagram of an exemplary embodiment of the present invention.
Figure 2A:
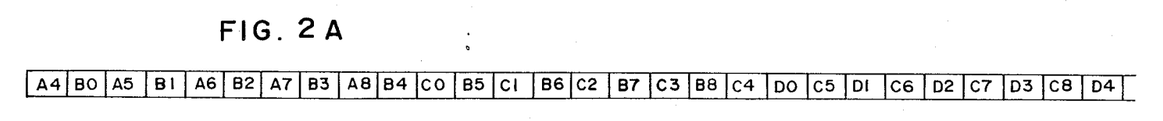
FIGS. 2A–2G are charts to which reference will be made in explaining the operation of the embodiment of FIG. 1.

FIG. 1 shows the circuit diagram of an exemplary embodiment contrived to carry out the present invention, and FIGS. 2A–2G are timing charts showing the operation of such circuit. In FIG. 1, a digital video signal of FIG. 2A is fed to an input terminal 1. This digital video signal is formed of 4:0:0 component signals by the endocer described with reference to FIG. 3.

Figure 2B:
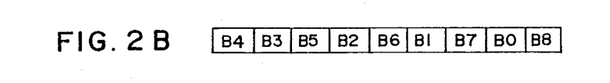
Figure 2C:
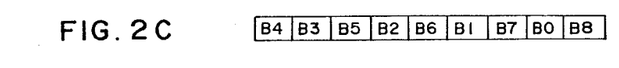
Figure 2D:
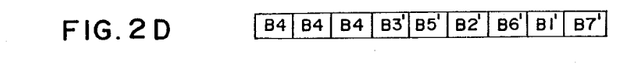
Figure 2E:
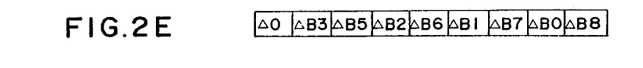

The input digital video signal is fed to a shuffling circuit 2, in which the input signal is shuffled in such a manner that the center sample of each group is positioned at the head of the alternate 9 samples where the polarity of addition of the color difference signals CR and CB to the luminance signal Y is the same. For example, the 9 samples of B0–B8) in FIG. 2A are rearranged to the sequence of (B4, B3, B5, B2, B6, B1, B7, B0, B8) by the shuffling circuit 2 as shown in FIG. 2B.

The output signal of the shuffling circuit 2 is fed to a register 3 while being fed also to one of three input terminals of a selector 4. The register 3 has a delay of one sample time and produces the output signal shown in FIG. 2C. The output of the register 3 is fed to a DPCM encoder 6. Meanwhile the output signal of the selector 4 is fed to a register 5. The output signal (FIG. 2D) of the register 5 is fed back to an input terminal of the selector 4 and is also fed to the DPCM encoder 6 and through a register 8 to an adder 9. The output signal (FIG. 2F) of the adder 9 is fed to the remaining input terminals of the selector 4.

In the DPCM encoder 6, the content (FIG. 2D) of the register 5 is subtracted from the content (FIG. 2C) of the register 3, and the differential value obtained as a result of such subtraction is fed to a ROM (not shown) for non-linear quantization. The 5-bit output signal (FIG. 2E) of the DPCM encoder 6 is fed via a register 10 to a multiplexer 11 and through a register 7 to the adder 9. Meanwhile the output signal of the register 5 is fed to another input of the multiplexer 11 via the register 8.

The output signal (FIG. 2G) from the multiplexer 11 is applied to an output terminal 12.

Figures 2F, 2G:
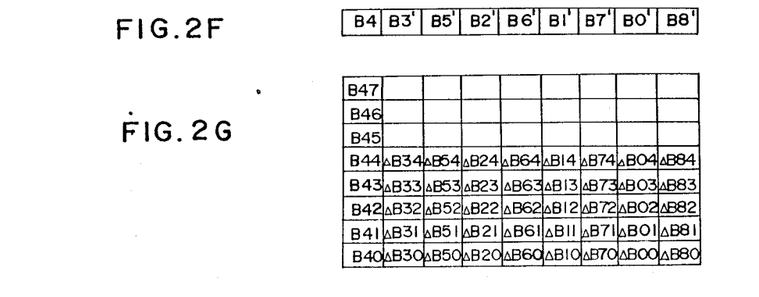

For instance, the differential value (B2−B3') is non-linearly quantized, and the 5-bit code signal and the decoded differential amount ΔB2 corresponding to such 5 bits are obtained from the DPCM encoder 6. The multiplexer 11 selects 8-bit center data at the timing of the feeding of the center data, or selects the 5-bit code signal at any other timing. According, the output signal of the multiplexer 11 is a mixture of 8-bit data and 5-bit data as shown in FIG. 2G. In the adder 9, the decoded differential amount is added to the output signal of the register 8, and then the output of the adder 9 is returned the decoded feedback data of FIG. 2F to the selector 4. For instance, B3' is [f(B3−B4)+B4=ΔB3+B4] and [B2'=f(B2−B3')+B3'=ΔB2+B3'].

In a recording unit (FIG. 9) to which the DPCM encoder according to this inventon is applied, the component color video datas Y, CR and CB are supplied to input terminals 41a, 41b and 41c, respectively. Such component color video data are then fed to a band compression encoder 42, where modulated digital red and blue color difference signals are superposed on a luminance signal in a predetermined phase relation to compress the bandwidth.

Figure 9:
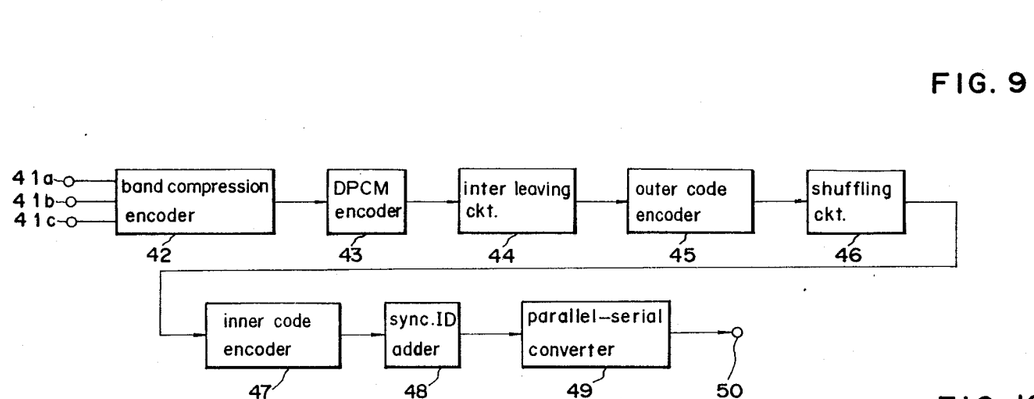
FIG. 9 is a block diagram of a recording unit in a digital VTR to which the present invention is applicable.

The band compression encoder 42 outputs a digital video signal converted from 4:2:2 mode to 4:0:0 mode, and such video signal is fed to DPCM encoder 43 which operates according to this invention as explained hereinbefore with reference to FIG. 1.

The output signal of the DPCM encoder 43 is fed to an interleaving circuit 44, whose output signal is then fed to an outer code encoder 45. Subsequently the output signal of the outer code encoder 45 is fed to a shuffling circuit 46, whose output signal is fed to an inner code encoder 47. Each of the interleaving circuit 44 and the shuffling circuit 46 has a memory for rearranging the sequence of the data as will be mentioned later. The outer code encoder 45 encodes 60-byte data by Reed-Solomon code to produce a 4-byte check code capable of 4 erasure correction. Meanwhile the inner code encoder 47 encodes 126-byte data by Reed-Solomon code to produce an 8-byte check code capable of 3-byte error correction.

The output signal of the inner code encoder 47 is fed to a sync.ID adder 48, where a block synchronizing signal and ID signals are added. The ID signals include a signal to identify a field, a signal to identify a frame, and another ID signal to identify a head. Further, in the sync.ID adder 48, an address signal is added to the respective inner code block. The output signal of the sync.ID adder 48 is fed to a parallel-serial converter 49 in which parallel data of the output signal will be converted into serial data thereof. The output signal of the parallel-serial converter 49 is applied to an output terminal 50. Although not shown, a magnetic head is connected to such output terminal 50 via a reproducing amplifier and a rotary transformer, whereby the data is recorded on a magnetic tape.

Figure 10:
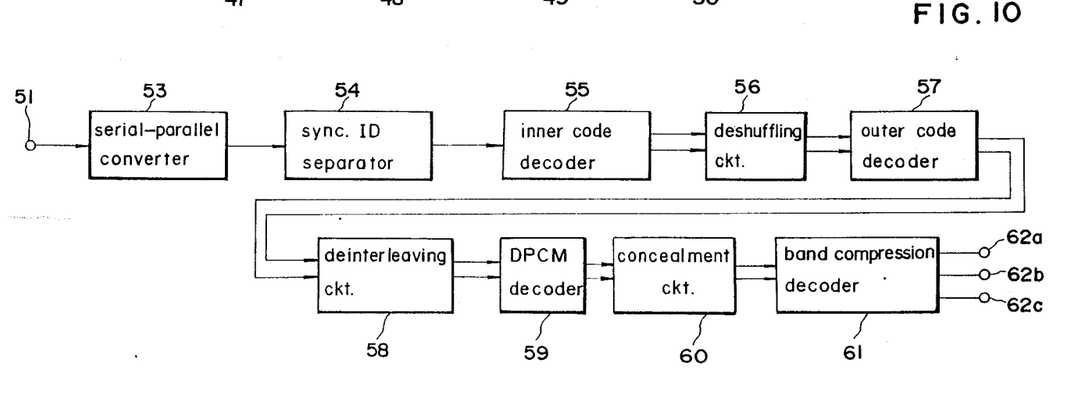
FIG. 10 is a block diagram of a reproducing unit in the digital VTR.

The data reproduced from the magnetic tape is supplied to an input terminal 51 of a reproducing unit shown in FIG. 10. The reproduced data obtained through the input terminal 51 is fed to a serial-parallel converter 53 for outputting a corresponding byte of parallel data. Such parallel data is fed to a sync.ID separator 54 which detects the synchronizing signal and the ID signals. Then, any inner code data error is corrected by an inner code decoder 55 in the next stage.

The error-corrected data obtained from the inner code decoder 55 and a flag representing the presence or absence of an error are fed to a deshuffling circuit 56 whose operation is the reverse of that performed by the shuffling circuit 46 in the recording unit. The output signal of the deshuffling circuit 56 is fed to an outer code decoder 57 which executes erasure correction of Reed-Solomon code. Subsequently, the output signal of the outer code decoder 57 is fed to a deinterleaving circuit 58 whose operation is the reverse of that performed by the interleaving circuit 44 in the recording unit.

The output signal of the deinterleaving circuit 58 is fed to a DPCM decoder 59, where the DPCM signal is decoded so that the 6-byte cluster is restored to the former 9-byte cluster. The output signal of the DPCM decoder 59 is fed to an error concealment circuit 60, where the sample data not corrected by the inner and outer codes is interpolated by data having a close correlation to the sample data. The erroneous output signal of the error concealment circuit 60 is fed to a band compression decoder 61, in which a luminance signal is separated from a red color difference signal and a blue color difference signal through a comb filter, and which generates 4:2:2 component video data at output terminals 62a, 62b and 62c, respectively.

Figure 11:
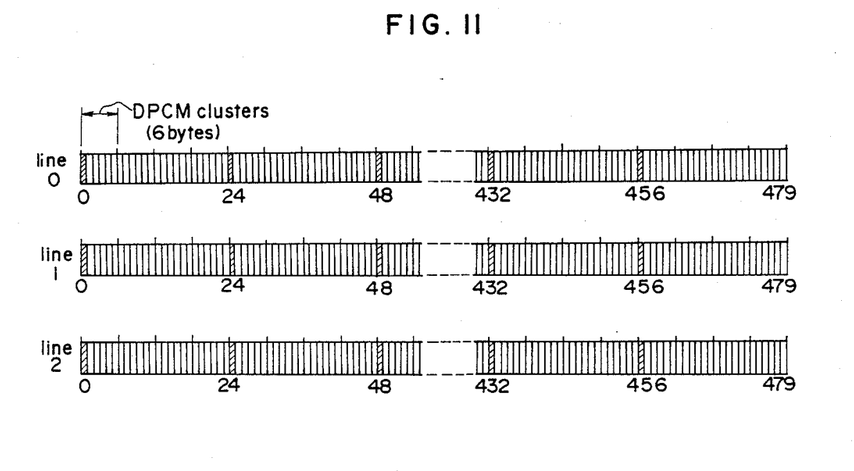
FIG. 11 schematically illustrates an operation of interleaving.

In an embodiment described with reference to FIGS. 9 and 10, 3-line interleaving operation is executed as shown in FIG. 11 by the interleaving circuit 44 located in the stage preceding the outer encoder 45.

There are included DPCM 480-byte data in one line. Such 480-byte data are formed into DPCM clusters each composed of 6 bytes. The interleaving operation is a process to collect the data positioned at an interval of 24 bytes. In FIG. 11, for instance, 60-byte datas positioned at the 0th, 24th, 48th . . . 456th bytes in the 3-lines, and which are indicated by hatched lines, are collected as an outer code block to the outer code encoder 45, which then encodes the input data by (64, 60) Reed-Solomon code.

Figure 12:
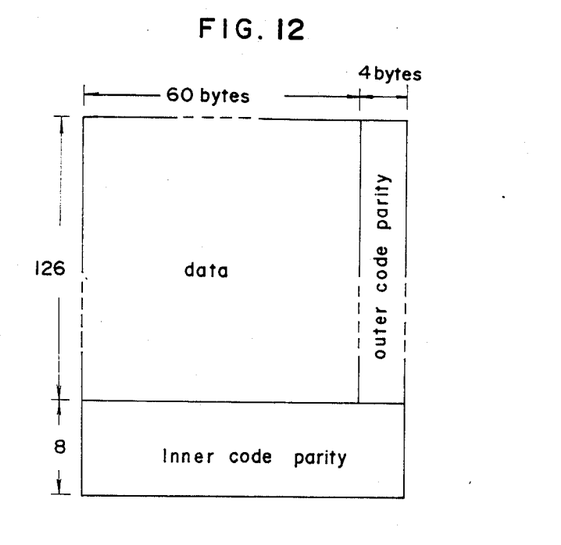
FIG. 12 is a schematic diagram showing the composition of a product code used in an exemplary embodiment of the present invention.

In this example, 126 outer code blocks, each composed of 60-byte data and 4-byte check codes, are arranged as shown in FIG. 12 and are shuffled in the shuffling circuit 46. Subsequently, in the inner code encoder 47, the 126 samples arrayed vertically in the outer code blocks are encoded by the inner code. The shuffling operation is performed so as to maintain the relationship in which the DPCM clusters in 6 successive lines are included in the same inner code block. Thus, the shuffling process is executed on the basis of DPCM clusters. In the erroneous inner code encoder 47, 21 DPCM clusters (126 bytes) are encoded by the Reed-Solomon code, and 8-byte check code is generated. When the encoded data are recorded on a magnetic tape, a synchronizing signal, ID signals and an address signal of 6 bytes are added to constitute internal code block data of 140 bytes.

What is claimed is:

1. Method for transmitting a digital video signal which is modulated with differential pulse code modulation, comprising:
   grouping a predetermined number of samples of said digital video signal which are at alternate sample positions in a horizontal line so as to provide respective sample groups;
   differentially modulating the samples other than the center sample in each of said groups of samples with reference to said center sample of the respective group; and
   transmitting the differentially modulated other samples and the center sample having an original number of bits as a cluster of samples;
   each said group of samples comprising N samples wherein N is an odd integer, and the center samples of successive groups are N sample positions apart.

2. Method according to claim 1, in which said transmitting step comprises interleaving samples of each cluster with samples of the other cluster.

3. Method for transmitting a digital video signal which is modulated with differential pulse code modulation, comprising:
   grouping a predetermined number of samples of said digital video signal which are at alternate sample positions in a horizontal line so as to provide respective sample groups;
   differentially modulating the samples other than the center sample in each of said groups of samples with reference to said center sample of the respective group; and
   transmitting the differentially modulated other samples and the center sample having an original number of bits as a cluster of samples;
   and in which said digital video signal comprises component video data which are frequency-compressed by combining a luminance signal Y with color difference signals CR and CB having a predetermined phase sequence, and each said cluster of samples is formed of the frequency-compressed component video data having the same phase relation.

4. Method according to claim 3, in which the color difference signals CR and CB are combined with the luminance signal Y with the same phase relation at every second sample, and each said cluster of samples comprises N frequency-compressed component video data which are at alternate sample positions, N being an odd integer.

5. Apparatus for transmitting a digital video signal which is modulated with differential pulse code modulation, comprising:
   means for grouping a predetermined number of samples of said digital video signal which are at alternate sample positions in a horizontal line so as to provide respective sample groups;
   means for differentially modulating the samples other than the center sample in each of said groups of samples with reference to said center sample of the respective group;

means for transmitting the center sample having an original number of bits and the differentially modulated other samples as a cluster of samples;

said digital video signal comprising frequency-compressed component video data in which a luminance signal Y is combined with color difference signals CR and CB having a predetermined phase sequence, and in which each said cluster of samples is formed of frequency-compressed component video data having the same phase relation; and said means for grouping comprising means for shuffling said cluster of samples so as to have a sequence headed by said center sample and followed by the other samples of the respective group.

6. Apparatus according to claim 5, in which said means for differentially modulating comprises encoder means for differentially modulating said cluster of samples from said shuffling means with delayed samples which correspond to said cluster of samples and output samples of said encoder means.

7. Apparatus according to claim 6, in which said means for differentially modulating further comprises a selector for selectively supplying to said encoder means said cluster of samples and said output samples from said encoder means so that said delayed samples corresponding to a group have a sequence of said center sample, the adjacent samples and the next adjacent samples of the respective group, and a multiplexer for selectively feeding said center sample and said output samples from said encoder means as an encoded output.

* * * * *